(12) United States Patent
Foursa et al.

(10) Patent No.: US 6,456,425 B1
(45) Date of Patent: Sep. 24, 2002

(54) METHOD AND APPARATUS TO PERFORM LUMPED RAMAN AMPLIFICATION

(75) Inventors: Dimitri Foursa, Freehold, NJ (US); Howard Kidorf, Red Bank, NJ (US); Alexei Pilipetski, Colts Neck, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 47 days.

(21) Appl. No.: 09/589,465

(22) Filed: Jun. 7, 2000

(51) Int. Cl.[7] .................................. H01S 3/06
(52) U.S. Cl. .................. 359/334; 359/160; 359/337.2; 359/341.31; 372/3
(58) Field of Search ................ 359/124, 134, 359/160, 334, 337.2, 341.31, 341.3; 372/3

(56) References Cited

U.S. PATENT DOCUMENTS

| | | | |
|---|---|---|---|
| 4,805,977 A | * 2/1989 | Tamura et al. | 359/134 |
| 4,881,790 A | * 11/1989 | Mollenauer | 359/134 |
| 4,923,291 A | * 5/1990 | Edagawa et al. | 359/334 |
| 5,111,334 A | 5/1992 | Heidemann | |
| 5,392,154 A | * 2/1995 | Chang et al. | 359/341 |
| 6,038,356 A | 3/2000 | Kerfoot, III et al. | |
| 6,049,417 A | * 4/2000 | Srivastava et al. | 359/341 |
| 6,052,219 A | 4/2000 | Kidorf et al. | |
| 6,151,160 A | * 11/2000 | Ma et al. | 359/341 |
| 6,205,268 B1 | * 3/2001 | Chraplyvy et al. | 385/24 |

FOREIGN PATENT DOCUMENTS

JP    10-073852    * 3/1998

OTHER PUBLICATIONS

Rattwitt et al, OFC '98, 3A, P D 6–1–4.*
Ohishi et al, Proc. 1998 11th Ann. Mtg. of IEEE Lasers & Electro Ost. Society, LEOS, pt. 1, Dec. 4, 1998; abst. Only Herewith.*
Kidorf et al, IEEE Photonics Technology Letters, vol. 11, No. 5, May 1999, pp. 530–532.*

* cited by examiner

*Primary Examiner*—Nelson Moskowitz (57) ABSTRACT

A method and apparatus to amplify an optical signal is described. A first filter splits an optical signal into a first and second parts. A first raman amplifier amplifies the first part. A second raman amplifier amplifies the second part. A combiner combines the amplified first and second parts.

11 Claims, 6 Drawing Sheets

METHOD AND APPARATUS TO PERFORM LUMPED RAMAN AMPLIFICATION

FIELD OF THE INVENTION

The invention relates to communications in general. More particularly, the invention relates to a method and apparatus to improve bandwidth of a raman amplifier for use with an optical communications system.

BACKGROUND OF THE INVENTION

Optical fiber amplifiers are fundamentally important to long-haul optical communications systems. Optical signals begin to attenuate as they travel over an optical fiber transmission medium due to a variety of factors such as fiber loss and dispersion. Optical amplifiers help compensate for such attenuation by providing additional power to the optical signal as it moves through the system.

There are two general classes of optical amplifiers. The first class of optical amplifiers is referred to as lumped amplifiers. Lumped amplifiers linearly increase optical signal power of a supplied input signal via stimulated emission of fiber dopants such as erbium that is subject to an optical pump source. An example of a lumped amplifier would be an Erbium Doped Fiber Amplifier (EDFA). The second class of optical amplifiers is referred to as distributed amplifiers. Distributed amplifiers increase optical signal power along the signal transmission path. An example of a distributed amplifier is a raman amplifier.

Raman amplification is accomplished by introducing the signal and pump energies along the same optical fiber. The pump and signal may be copropagating or counterpropagating with respect to one another. A raman amplifier uses Stimulated Raman Scattering (SRS), which occurs in silica fibers when an intense pump beam propagates through it. SRS is an inelastic scattering process in which an incident pump photon loses its energy to create another photon of reduced energy at a lower frequency. The remaining energy is absorbed by the fiber medium in the form of molecular vibrations (i.e., optical phonons). That is, pump energy of a given wavelength amplifies a signal at a longer wavelength.

Figure 1:
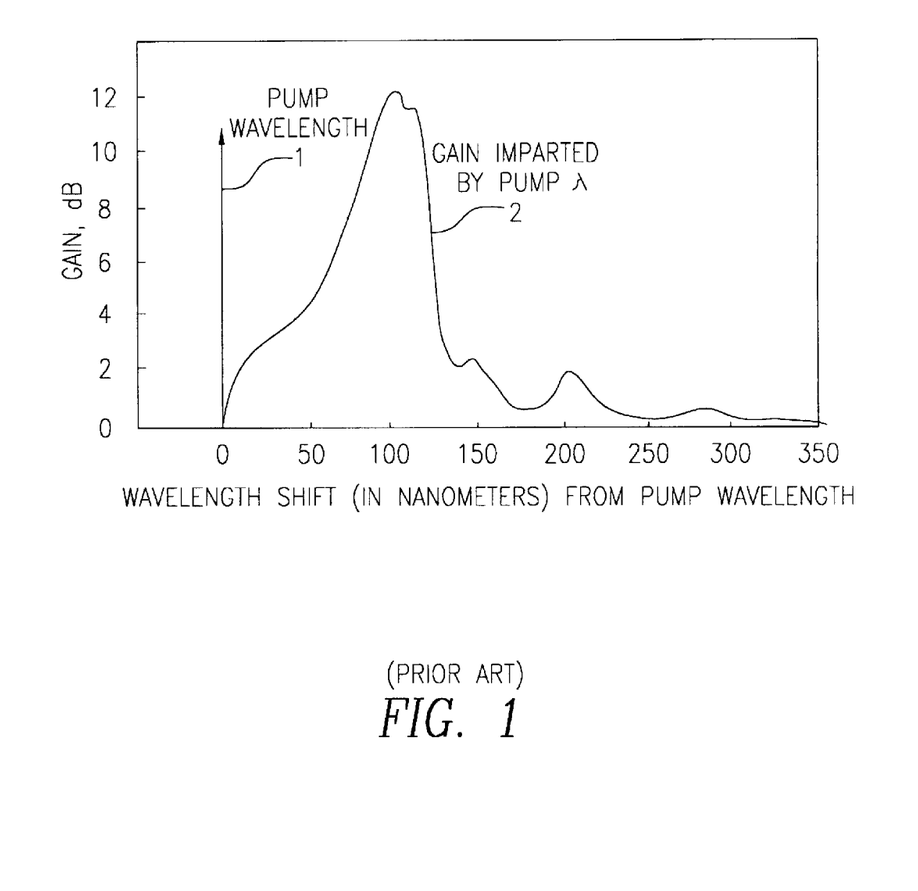
FIG. 1 (PRIOR ART) is a plot illustrating the relationship between the pump energy and the raman gain for a silica fiber.

FIG. 1 (PRIOR ART) is a plot illustrating the relationship between the pump energy and the raman gain for a silica fiber. The particular wavelength of the pump energy that is used in this example is denoted by reference numeral 1. As shown in FIG. 1, the gain spectrum 2 for this particular pump wavelength is shifted in wavelength with respect to the pump wavelength. Consequently, the bandwidth of the raman amplifier is limited. For example, the bandwidth of the amplifier shown in FIG. 1 is only about 20 nanometers (nm) at a gain of 10 decibels (dB).

Figure 2:
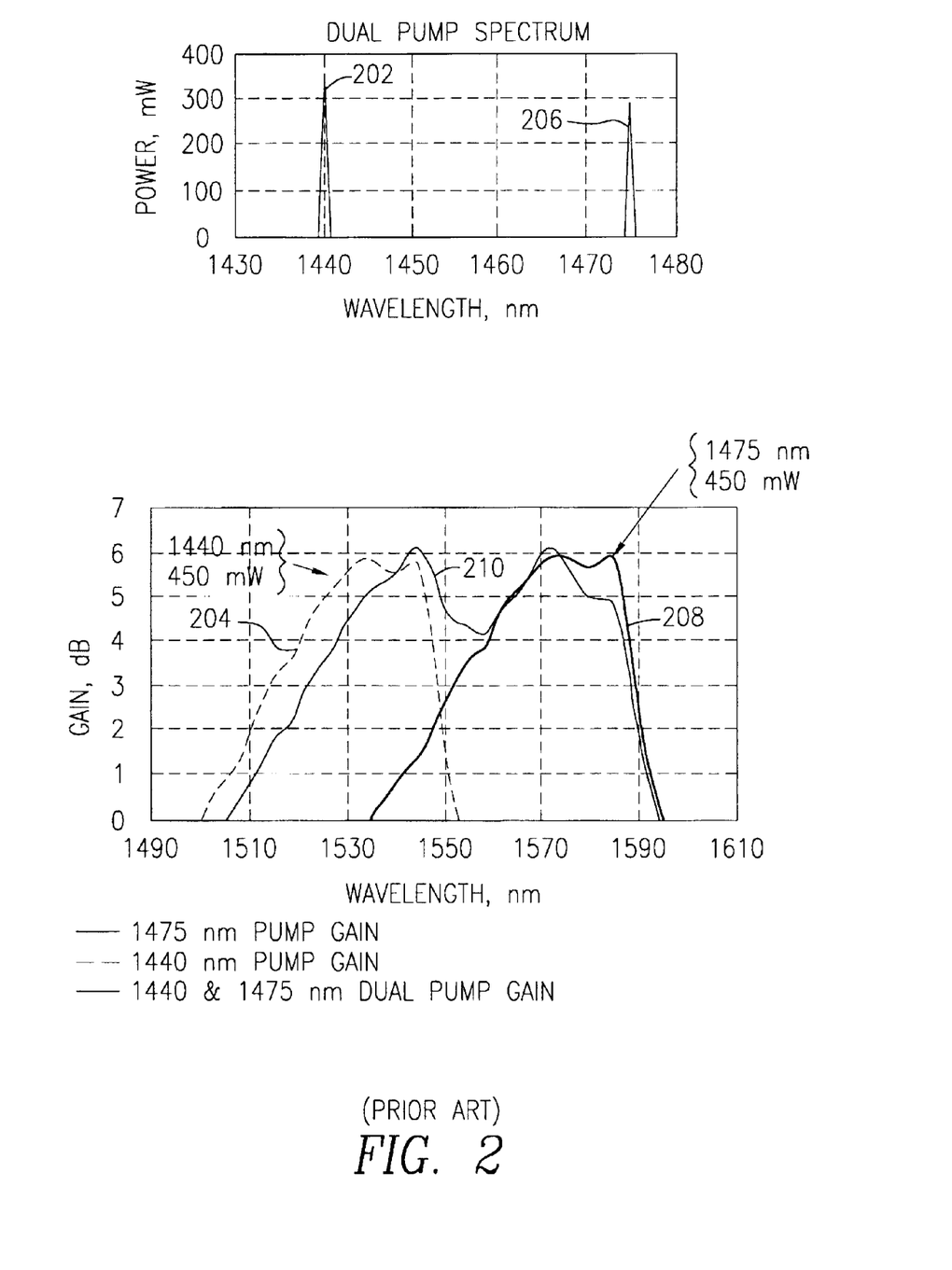
FIG. 2 (PRIOR ART) is a plot illustrating the relationship between the pump energy from multiple pumps and the raman gain for a silica fiber.

FIG. 2 (PRIOR ART) is a plot illustrating the relationship between the pump energy from multiple pumps and the raman gain for a silica fiber. One technique to increase the bandwidth of a raman amplifier is through the use of multiple pumps operating at different wavelengths. As shown in FIG. 2, pump energy supplied at a wavelength denoted by reference numeral 202 generates a gain curve 204 while pump energy supplied at a wavelength denoted by reference numeral 206 generates gain curve 208. The composite gain spectrum, indicated by curve 210, has a bandwidth that is greater than either of the individual gain curves 204 and 208.

Unfortunately, it becomes difficult to increase the bandwidth of a raman amplifier using multiple pumps beyond a limited amount. This limitation arises because it is not possible to provide pump energy that spectrally overlaps the signal. As a result, the wavelength separation between the pump wavelengths 202 and 206 is limited to about 100 nm, since at greater separations the pump wavelength 206 will overlap the gain curve 204 of pump wavelength 202.

In view of the foregoing, it can be appreciated that a substantial need exists for a method and apparatus to increase the bandwidth of a multi-pump raman amplifier without providing pump energy that spectrally overlaps the gain signal.

SUMMARY OF THE INVENTION

The embodiments of the invention include a method and apparatus to amplify an optical signal. The optical signal is split into a plurality of parts. Each part is amplified using a separate raman amplifier. Each amplified part is combined into a single amplified optical signal.

With these and other advantages and features of the invention that will become hereinafter apparent, the nature of the invention may be more clearly understood by reference to the following detailed description of the invention, the appended claims and to to the several drawings attached herein.

DETAILED DESCRIPTION

The embodiments of the invention comprise a method and apparatus to amplify an optical signal over a greater bandwidth than conventional amplifiers. The greater bandwidth is achieved through the use of a lumped raman amplifier. A lumped raman amplifier comprises multiple amplification stages, with each stage utilizing an individual multi-pump raman amplifier. This leverages the bandwidth advantages of conventional distributed raman amplifiers, which is currently limited to approximately 100 nm. The result is an increase in bandwidth that scales according to the number of stages implemented in a given lumped raman amplifier. For example, one embodiment of the invention comprises a lumped raman amplifier utilizing three amplification stages, and therefore three individual raman amplifiers. This embodiment of the invention has an available bandwidth of approximately 300 nm, or three times the bandwidth of a single multi-pump raman amplifier.

Raman amplifiers are traditionally implemented according to a distributed amplifier scheme. The embodiments of the invention organize a plurality of raman amplifiers according to lumped amplifier scheme. This extends the bandwidth advantages of multi-pump raman amplifiers beyond conventional multi-pump raman amplifiers.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 3:
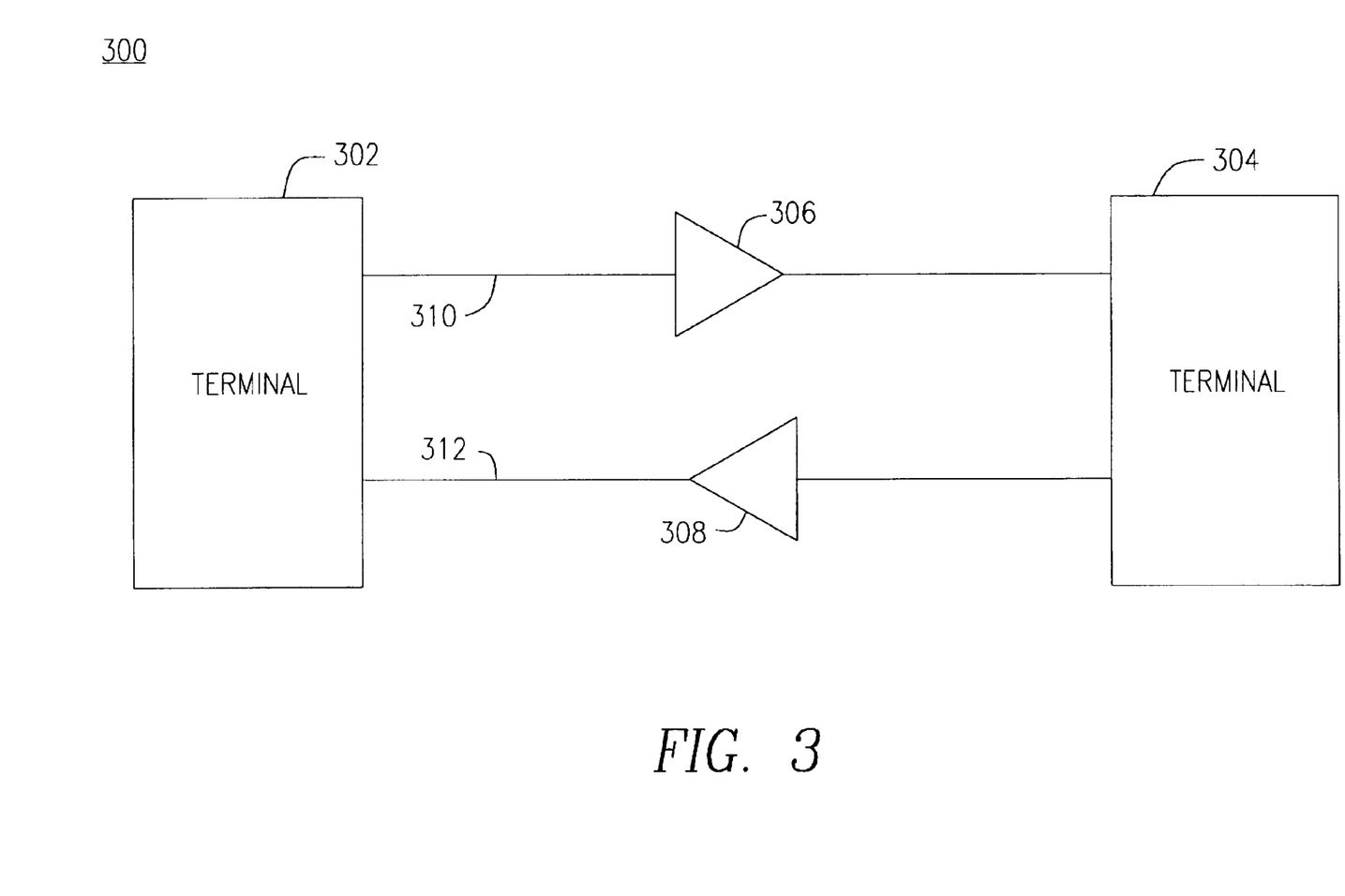
FIG. 3 is a system suitable for practicing one embodiment of the invention.

Referring now in detail to the drawings wherein like parts are designated by like reference numerals throughout, there is illustrated in FIG. 3 a system suitable for practicing one embodiment of the invention. FIG. 3 discloses an optical communication system 300 that utilizes optical fiber amplifiers such as raman amplifiers. The system includes transmitter/receiver ("transceiver") terminals 302 and 304 and optical transmission fiber paths 310 and 312 supporting bi-directional communication. The signals being transmitted from terminals 302 and 304 are in optical form. There is no intermediate conversion to electrical form. A plurality of optical amplifiers 306 and 308 are interposed in fiber paths 310 and 312 between terminals 302 and 304. The components of optical amplifiers 306 and 308 are shown in greater detail in FIG. 4. For clarity of discussion, fiber paths 310 and 312 are shown with only one optical amplifier each. It can be appreciated, however, that any number of optical amplifiers may be employed in each path and still fall within the scope of the invention.

Figure 4:
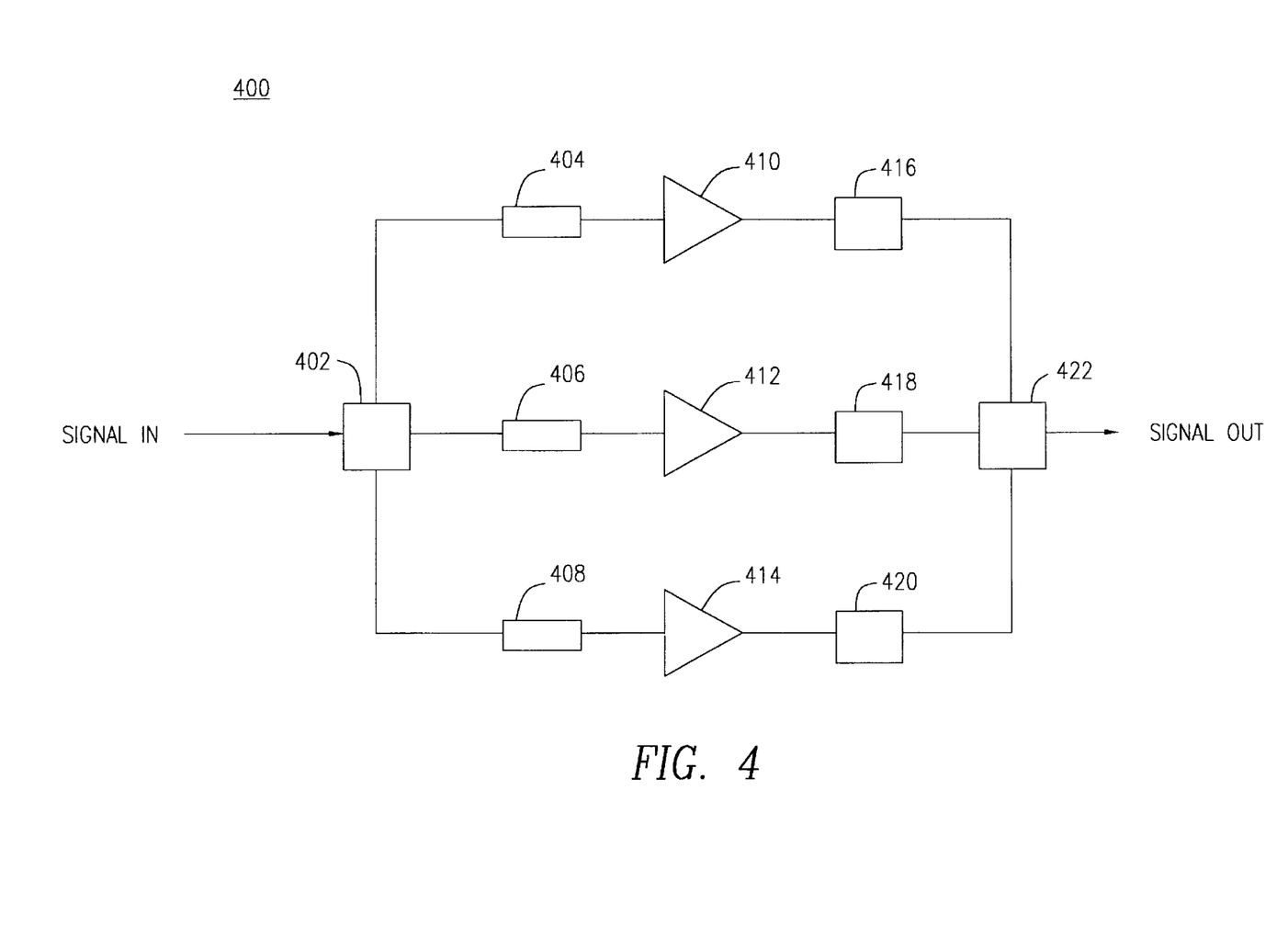
FIG. 4 is a block diagram of a lumped raman amplifier in accordance with one embodiment of the invention.

FIG. 4 is a block diagram of a lumped raman amplifier in accordance with one embodiment of the invention. FIG. 4 illustrates a lumped raman amplifier 400 that is representative of amplifiers 306 and 308, as discussed with reference to FIG. 3. Amplifier 400 comprises three amplification stages. Each amplification stage includes an optical isolator (404, 406 and 408), a multi-pump Raman amplifier (410, 412 and 414), and a bandpass filter (416, 418 and 420). Amplifier also includes a combiner 422 that combines the outputs from each of the amplification stages into a single amplified optical signal.

For purposes of clarity, amplifier 400 is described with three amplification stages. It can be appreciated, however, that any number of amplification stages may be used and still fall within the scope of the invention. In addition, each amplification stage is capable of increasing the bandwidth of a given part of an optical signal up to approximately 100 nm, depending on the configuration of each amplification stage and the raman amplifier used by each stage (discussed in more detail below).

Figure 5:
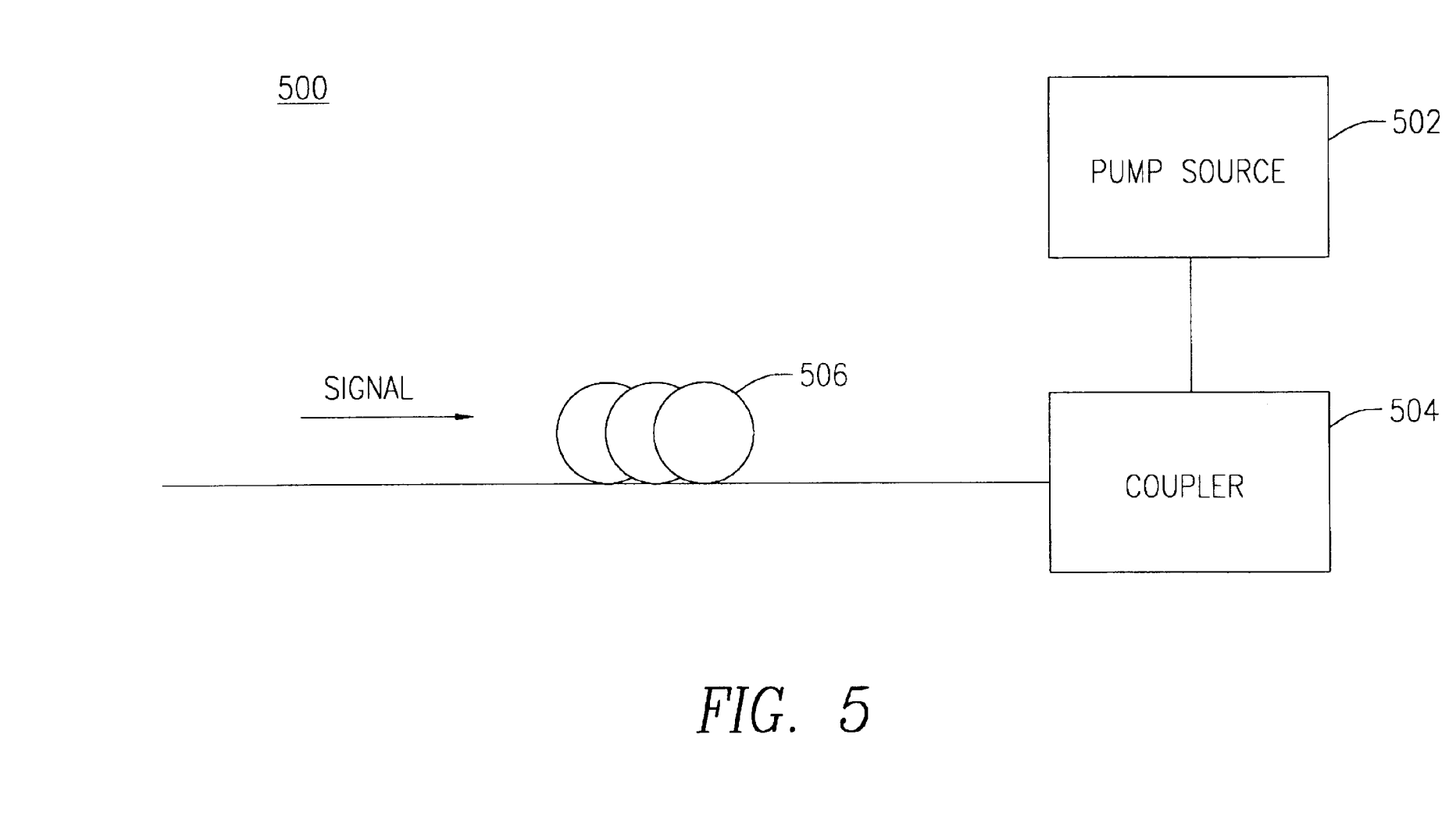
FIG. 5 is a block diagram of an individual raman amplifier suitable for use in a lumped raman amplifier in accordance with one embodiment of the invention.

FIG. 5 is a block diagram of an individual raman amplifier suitable for use in a lumped raman amplifier in accordance with one embodiment of the invention. FIG. 5 illustrates a raman amplifier 500 that is representative of raman amplifiers 410, 412 and 414, as discussed with reference to FIG. 4. Raman amplifier 500 includes a gain medium referred to as optical fiber portion 506 of the transmission path in which raman gain is to be generated. This portion 506 of fiber may vary in size and may be limited, for example, to a small section of the transmission path. Fiber portion 506 is coupled to a source of optical pump energy 502 via a coupler 504 such as a wavelength division multiplexer (WDM).

The given performance of each individual raman amplifier is design dependent. Design considerations include length of the gain medium (e.g., fiber portion 506), cross-section, dispersion characteristics of the fiber, power from the pump source (e.g, pump source 502), choice of Bragg grating or optical filter to recycle pump power, and various other factors. With respect to dispersion, each individual amplifier should be designed to manage dispersion such that the lumped raman amplifier has an overall average dispersion, for example, as close to zero as possible. This can be accomplished by, for example, combining positive and negative dispersion fibers resulting in a near zero dispersion slope. The dispersion compensation function performed by the lumped raman amplifiers obviates the need to use individual dispersion compensators for the system.

Figure 6:
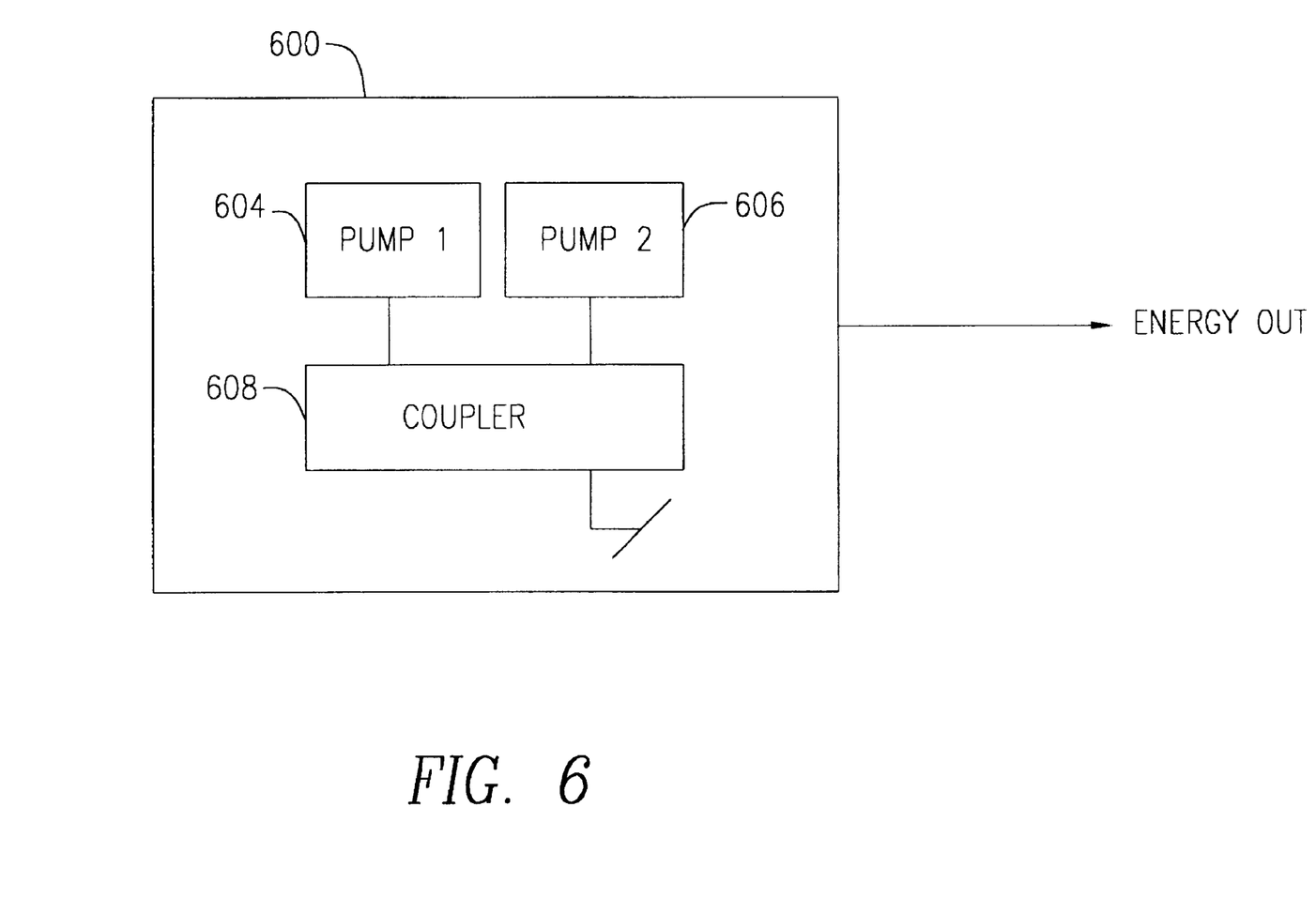
FIG. 6 is a block diagram of a pump source in accordance with one embodiment of the invention.

FIG. 6 is a block diagram of a pump source in accordance with one embodiment of the invention. FIG. 6 illustrates a pump source 600 that is representative of pump source 502, as discussed with reference to FIG. 5. Pump source 600 comprises a first optical pump 604 and a second optical pump 606. An optical coupler 608 combines the energy from pumps 604 and 606 and directs the resulting beam to WDM coupler 504. As previously explained, pumps 604 and 606 generate pump energy at different wavelengths selected to maximize the amplifier bandwidth. For example, pump 604 may provide pump energy at 1455 nm and pump 606 may provide pump energy at 1495 nm to amplify a WDM signal ranging from 1530–1610 nm. Although only two pumps are described with reference to pump source 600, it can be appreciated that any number of pumps can be used and still fall within the scope of the invention.

System 300 and amplifier 400 operate to increase bandwidth above the conventional limitation of 100 nm for an individual multi-pump raman amplifier. This is accomplished by adding additional amplification stages, with each stage including an additional raman amplifier. The ultimate bandwidth of an amplifier configured using the principles described herein directly corresponds to the number of added amplification stages. For example, the bandwidth of amplifier 400 is approximately 300 nm since there are three stages of raman amplification.

In operation, an optical signal is transmitted from terminal 302 to terminal 304. Amplifier 306 compensates for the attenuation of the optical signal as it travels over fiber optic path 310. Amplifier 306 receives the attenuated signal. A bandsplitting filter (e.g., bandsplitting filter 402) splits the optical signal into a number of parts equal to the number of amplification stages of amplifier 306. For example, if amplifier 306 includes two stages of amplification, the optical signal is split into a first part and a second part and sent to each respective amplification stage. If amplifier 306 includes three stages (e.g., amplifier 400), the optical signal is split into a first part, a second part and a third part, and sent to each respective amplification stage. Each part is sent through an optical isolator (e.g. 404, 406 or 408) to a raman amplifier (e.g., raman amplifier 410, 412 or 414). The raman amplifier amplifies the received part and sends the amplified part to a combiner (e.g., combiner 422). The combiner combines the amplified first and second parts into a single amplified optical signal.

Each raman amplifier amplifies its respective part. Each raman amplifier is a multi-pump raman amplifier that is capable of providing a bandwidth of up to 100 nm. Consequently, in an amplifier utilizing two raman amplifiers the available bandwidth is approximately 200 nm. Each individual raman amplifier contains a length of fiber (e.g., fiber 506) that provides a gain medium, an energy source (e.g., pump source 502) that pumps the fiber to provide gain, and a means of coupling the pump energy into the fiber without interfering with the signal being amplifier.

Although various embodiments are specifically illustrated and described herein, it will be appreciated that modifications and variations of the present invention are covered by the above teachings and within the purview of the appended claims without departing from the spirit and intended scope of the invention. In another example, the embodiments were described using a communication network. A communication network, however, can utilize an infinite number of network devices configured in an infinite number of ways. The communication network described herein is merely used by way of example, and is not meant to limit the scope of the invention.

What is claimed is:

1. A multiple stage optical amplifying apparatus, comprising:
    an optical filter to split an optical signal into first and second bands of optical channels, said first band including a first plurality of channels, each at a respective wavelength and said second band including a second plurality of channels, each at a respective wavelength;
    a first Raman amplifier coupled to said filter, said first Raman amplifier including a gain medium and a pump source, said pump source providing a pump signal at a first pump wavelength to said gain medium;
    a second Raman amplifier coupled to said filter, said second Raman amplifier including a gain medium and a pump source, said pump source providing a pump signal at a second pump wavelength to said gain medium, wherein said second pump wavelength is outside of said wavelengths associated with said first band; and
    a combiner optically coupled to said first and second Raman amplifiers configured to combine said amplified first and second bands, wherein each of said first and second Raman amplifiers utilize an associated maximum bandwidth to amplify the maximum number of optical channels for each stage of said multiple stage amplifying apparatus.

2. The optical apparatus of claim 1, wherein said optical filter is a first filter and each of said first and second raman amplifiers further comprise:
    an isolator coupled to said optical filter;
    a coupler to couple said pump signal to said gain medium; and
    a second optical filter coupled to said combiner.

3. The optical amplifier of claim 2, wherein said gain medium is a length of fiber to generate raman gain.

4. The optical amplifier of claim 2, wherein said pump source has a plurality of pumps operating at different wavelengths.

5. The optical amplifier of claim 2, wherein said coupler is a wavelength division multiplexer.

6. The optical amplifier of claim 2, wherein said first filter is a bandsplitting filter.

7. The optical amplifier of claim 2, wherein said second filter is a bandpass filter.

8. A method of amplifying an optical signal having a plurality of optical channels, each at a respective wavelength, utilizing multiple amplification stages, said method comprising the steps of:
    splitting the optical signal into a plurality of bands of optical channels, said first band including a first plurality of channels each at a respective wavelength, and said second band including a second plurality of channels each at a respective wavelength;
    amplifying a first of said plurality of channels using a first Raman amplifier pumped at a first wavelength;
    amplifying a second of said plurality of channels using a second Raman amplifier pumped at a second wavelength wherein said second pump wavelength is outside of said wavelengths associated with said first band; and
    combining said amplified bands, wherein each of said first and second Raman amplifiers utilize an associated maximum bandwidth to amplify the maximum number of optical channels for each stage of said multiple stage amplifying apparatus.

9. The method of claim 8, wherein said method of amplifying further comprises the steps of:
    isolating each band;
    sending each through a gain medium included in each of said first and second raman amplifiers;
    pumping each of said gain mediums; and filtering each amplified part.

10. An optical communication system employing multiple stage amplification comprising:
    a transmit terminal to send an optical signal having a plurality of channels, each channel at a particular wavelength;
    a receive terminal;
    an optical transmission path disposed between said transmit and receive terminals;
    at least one lumped multiple stage Raman amplifying apparatus disposed along said transmission path, said amplifying apparatus further comprising:
        an optical filter to split said optical signal into first and second bands of optical channels, said first band including a first plurality of channels, said second band including a second plurality of channels;
        a first Raman amplifier coupled to said filter, said first Raman amplifier including a gain medium and a pump source, said pump source providing a pump signal at a first pump wavelength to said gain medium;
        a second Raman amplifier coupled to said filter, said second Raman amplifier including a gain medium and a pump source, said pump source providing a pump signal at a second pump wavelength to said gain medium, wherein said second pump wavelength is outside of said wavelengths associated with said first band; wherein each of said first and second Raman amplifiers utilize an associated maximum bandwidth to amplify the maximum number of optical channels for each stage of said multiple stage amplifying apparatus; and
        a combiner optically coupled to said first and second Raman amplifiers configured to combine said amplified first and second bands and supply said combined signal onto said transmission path.

11. The optical apparatus in accordance with claim 1, wherein said first and second raman amplifiers are lumped raman amplifiers.

* * * * *

UNITED STATES PATENT AND TRADEMARK OFFICE
CERTIFICATE OF CORRECTION

PATENT NO. : 6,456,425 B1
DATED : September 4, 2002
INVENTOR(S) : Dmitri Foursa et al.

It is certified that error appears in the above-identified patent and that said Letters Patent is hereby corrected as shown below:

<u>Title page,</u>
Item [75], change "Dimitri Foursa" to read -- Dmitri Foursa -- and "Alexei Pilipetski" to -- Alexi Pilipetskii --.
Item [57], ABSTRACT,
Lines 3 and 4, change "raman" to -- Raman --.

<u>Column 1,</u>
Lines 6, 29, 33, 43, 49, 54, 55 and 65, change "raman" to -- Raman --.
Line 23, change "erbium" to -- Erbium --.

<u>Column 2,</u>
Lines 8, 16, 48, 49, 51, 52, 55, 57, 58, 61, 64, 66 and 76, change "raman" to -- Raman --.

<u>Column 3,</u>
Lines 13, 27, 29, 45, 47, 48, 50, 54 and 59, change "raman" to -- Raman --.

<u>Column 4,</u>
Lines 1, 6, 26, 28, 33, 47, 48, 53, 54, 56 and 58, change "raman" to -- Raman --.

<u>Column 6,</u>
Lines 57 and 58, change "raman" to -- Raman --.

Signed and Sealed this

Twenty-ninth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,456,425 B1  
DATED : September 4, 2002  
INVENTOR(S) : Dmitri Foursa et al.

Page 1 of 1

It is certified that error appears in the above-identified patent and that said Letters Patent is hereby corrected as shown below:

Title page,
Item [75], Inventors, change "Dimitri Foursa" to read -- Dmitri Foursa -- and "Alexi Pilipetski" to -- Alexi Pilipetskii --.
Item [57], ABSTRACT,
Lines 3 and 4, change "raman" to -- Raman --.

Column 1,
Lines 6, 29, 33, 43, 49, 54, 55 and 65, change "raman" to -- Raman --.
Line 23, change "erbium" to -- Erbium --.

Column 2,
Lines 8, 16, 48, 49, 51, 52, 55, 57, 58, 61, 64, 66 and 67, change "raman" to -- Raman --.

Column 3,
Lines 13, 27, 29, 45, 47, 48, 50, 54 and 59, change "raman" to -- Raman --.

Column 6,
Lines 57 and 58, change "raman" to -- Raman --.

This certificate supersedes Certificate of Correction issued April 29, 2003.

Signed and Sealed this

Thirtieth Day of August, 2005

JON W. DUDAS  
*Director of the United States Patent and Trademark Office*